United States Patent [19]
Hulyalkar et al.

[11] Patent Number: 6,069,901
[45] Date of Patent: May 30, 2000

[54] USE OF ENERGY BURSTS FOR WIRELESS NETWORKS

[75] Inventors: Samir Hulyalkar, White Plains; Chiu Ngo, Ossining, both of N.Y.

[73] Assignee: Philips Electronics North America Corporation, New York, N.Y.

[21] Appl. No.: 08/767,101

[22] Filed: Dec. 4, 1996

[51] Int. Cl.$^7$ ....................................... H04J 3/06
[52] U.S. Cl. ........................... 370/509; 370/330; 370/345
[58] Field of Search .................... 370/335, 336, 370/345, 346, 347, 348, 349, 350, 509, 510, 503, 329, 330; 455/39, 500, 507, 517, 509

[56] References Cited

U.S. PATENT DOCUMENTS

| | | |
|---|---|---|
| 5,166,929 | 11/1992 | Lo . |
| 5,208,812 | 5/1993 | Dudek et al. ............................. 370/280 |
| 5,410,588 | 4/1995 | Ito . |
| 5,625,627 | 4/1997 | Ishi .......................................... 370/347 |
| 5,740,166 | 4/1998 | Ekemark et al. ....................... 370/331 |
| 5,745,484 | 4/1998 | Scott ........................................ 370/347 |
| 5,748,622 | 5/1998 | Garcia Vacas .......................... 370/337 |
| 5,761,198 | 6/1998 | Kojima ..................................... 370/337 |
| 5,764,648 | 6/1998 | Yamane et al. .......................... 370/516 |

*Primary Examiner*—Ajit Patel
*Assistant Examiner*—Bob A. Phunkulh
*Attorney, Agent, or Firm*—Gregory L. Thorne; Daniel J. Piotrowski

[57] ABSTRACT

A method and apparatus for communicating control signals via short energy bursts during a predetermined time interval. This method and apparatus is particularly well suited for wireless communication networks wherein the time intervals are assigned to each station on the network, and the presence of energy in that time interval signals a control signal to or from that station.

17 Claims, 6 Drawing Sheets

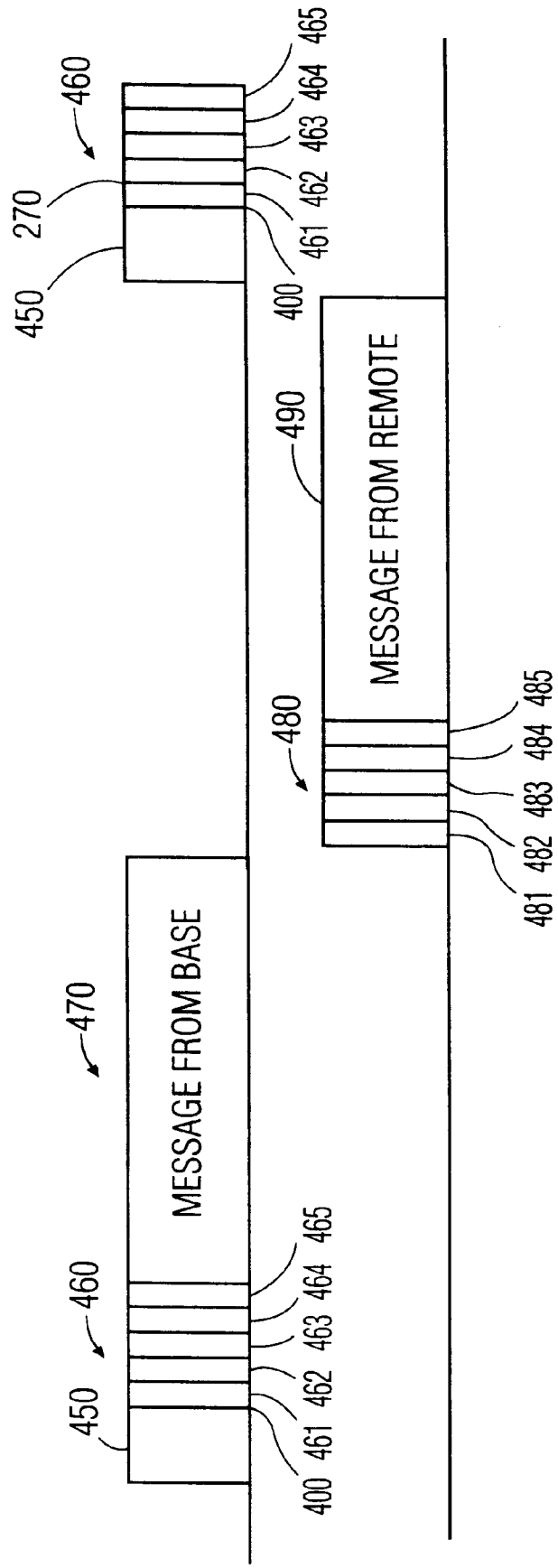

USE OF ENERGY BURSTS FOR WIRELESS NETWORKS

BACKGROUND OF THE INVENTION

1. Field of the Invention

This invention generally relates to communication networks and protocols, with particular relevance to wireless networks, or other networks requiring minimal turnaround signaling time.

2. Discussion of the Related Art

Currently, communication networks are formed by interconnecting devices by wire or cable, and having each device conform to a protocol for sending messages along these wires and cables. In some instances, a portion of such a network may be implemented as a wireless connection, employing radio or infrared frequency signals between nodes. Such wireless connections are point-to-point, having a single communications device at each end, each tuned to each other at a frequency different from other devices in the same geographic area.

A wireless network, on the other hand, is formed without physical connections among the devices, employing, for example, radio frequency signals. Each device on the network is tuned to the same frequency, and each device conforms to a protocol for sending messages at this common frequency. The protocol may allow communication among all the devices in the network or the protocol may constrain each device to only communicate with a master device. Wireless networks offer a significant logistical advantage over wired networks, by obviating the need to run wires or cables to each device.

With increased availability of multimedia technologies, and the increased demand for information access, the market potential for residence or business based Local Area Networks (LANs) is growing. The ease of installation and expansion of a wireless network is certain to create a large demand for wireless LANs. For example, a central base station may provide wireless services, including voice, video, and data, to all the communications devices in one's home, or a wireless base station may provide for the communication among all the portable computers in an office, or all the computers on a campus. To be successful, however, the techniques and protocols employed in these wireless networks must not be significantly inferior to their wired network equivalents.

During the past decades, protocols have been developed for effectively and efficiently managing the transfer of information within networks of communicating equipment. An underlying premise in the development of these network protocols has been that of a wired network infrastructure. In a wireless network, the assumptions upon which the wired network protocols were developed may no longer be valid. Although most of the existing protocols are functionally extensible to wireless networks, their effectiveness and efficiency may be adversely affected by the lack of a direct connection among devices.

A common protocol employed for data communications in a wired network is a bus structure with a "broadcast" protocol. Devices on the bus monitor the bus, wait for a quiet period, then transmit. Collisions occur when a second device, having also waited for the quiet period, simultaneously begins to transmit. The broadcast protocol typically calls for the devices to cease transmission in the event of a collision, and try again at the next quiet period. Repeated collisions are avoided by having the devices each randomly change their time of response from the start of the quiet period, so that they will no longer respond simultaneously. This broadcast protocol, as the name implies, has its roots in radio transmission, and is still widely used for voice wireless networks, such as CB radios.

The broadcast protocol, however, is unsuitable for high speed data communications on a wireless network because collision detection on a wireless network is time-consuming. On a wired network, the protocol typically calls for an active assertion of one logic level, but the passive assertion (i.e. a non-assertion of the active level) of the other level. Collisions are detectable at the transmitter by monitoring the bus during the transmission of a passive level. If an active level is detected during this transmitter's transmission of a passive level, it necessarily implies a collision. The wired transmitter can automatically retransmit the message at the next quiet period. A device transmitting on a wireless network, however, is unable to detect whether another device is transmitting at the same time. The device transmitting, if it monitors the transmission frequency, will only detect its own transmission, because its power level will be significantly higher than that of a remote transmitter. The intended receiver, however, being remote from both transmitters, typically receives a garbled message caused by the simultaneous transmission by two transmitters on the same frequency. Because collisions are likely to occur, and the transmitter has no means to detect these collisions, the wireless broadcast protocol typically requires the intended receiver to acknowledge (ACK) the receipt of each message. If it doesn't receive the message, or receives a garbled message, it doesn't transmit the acknowledgement, or transmits a Not-acknowledged (NAK) signal. If the transmitter fails to receive an acknowledgement, it retransmits the prior message. The requirement for an acknowledgement from the receiver for each message in a wireless network has a compounding adverse effect, because the transmission of each acknowledgement can also cause collisions. As traffic density increases, the likelihood of collision increases exponentially because of the increased acknowledgement traffic, as well as the repeated transmissions with each collision.

Polling network protocols, wherein a master device polls each of the other devices for messages, are applicable to wireless networks. Such protocols, however, are inherently inefficient for networks with uneven traffic patterns. During the polling process, each device on the network is queried, and the polling of inactive devices consumes time. Most polling protocols allow for the suspension of the polling of a device after some period of inactivity, to save time, but such protocols must also include a means for the unpolled device to notify the master device when it becomes active again. Often this reactivation notification is accomplished by providing an auxiliary connection to the master device, for example an interrupt line common to all devices. The equivalent of an additional auxiliary connection in a wired network is an additional auxiliary frequency in a wireless network. Alternatively, a period of time can be set aside in each message period for a notification signal. The occurrence of a reactivation notification on this common line, or during the notification period, causes the master device to repoll all the devices on the network to determine which device is now active.

Thus, it is seen that the transformation of a wired network protocol to a wireless network protocol typically requires additional time, or frequency, or both. This added demand of time or frequency is for the transfer of control information for the management of the wireless network. It is the purpose of this invention to minimize the time required to communicate such control information within a network. Although the invention presented is particularly applicable to wireless networks, the principles embodied are equally applicable to minimize the time required to transfer control information on a wired network as well.

SUMMARY OF THE INVENTION

Essentially, the invention describes a method for transmitting control information in short energy bursts within a wireless network protocol.

The invention is best appreciated by noting that control information on a network typically comprises short messages with minimal, albeit important, information. That is, control information is typically that which, on a wired network, might be implemented on a single wire having one of two states. For example, a "Request to Send" line might be provided on a wired network for a device to notify the master device that it has information to send. A "Clear to Send" line might be provide to notify the device that transmission can begin, or, the same "Request to Send" line could be employed by the master to signal this "Clear to Send" message at a subsequent time period. Similarly, an "Acknowledge" line might also be provided. In each case, the information content comprises a single bit of information: either the device has, or has not, something to send; either the message was received, or it was not received; etc. Contrary to this single bit control information content, the data content communicated in a wireless network is expected to contain significantly more information. Employing the same protocol for both data and control is inefficient in one or the other protocols, or both.

This invention provides for a very efficient and effective means for communicating single bit control information messages within a wireless network without necessarily limiting or affecting the protocol employed for effective data transfer.

This efficient and effective communications means is effected by synchronizing all devices to a master device, and allocating a small unit of time, relative to the synchronous period, to each device. The presence, or absence, of energy at the network frequency during each device's allocated time will signify the state of the one bit of control information for that device. Depending on the function of the control bit, the presence of energy in the allocated time slot can be asserted by either the master device or each of the other devices. As an extension of this basic design, multiple control bits can be accommodated by multiple allocations of time, as required.

BRIEF DESCRIPTION OF THE DRAWINGS

FIG. 4 shows a timing diagram for receiving and transmitting control bits and messages on the same frequency, or wire, in accordance with this invention.

DETAILED DESCRIPTION OF THE PREFERRED EMBODIMENTS OF THE INVENTION

Figure 1:
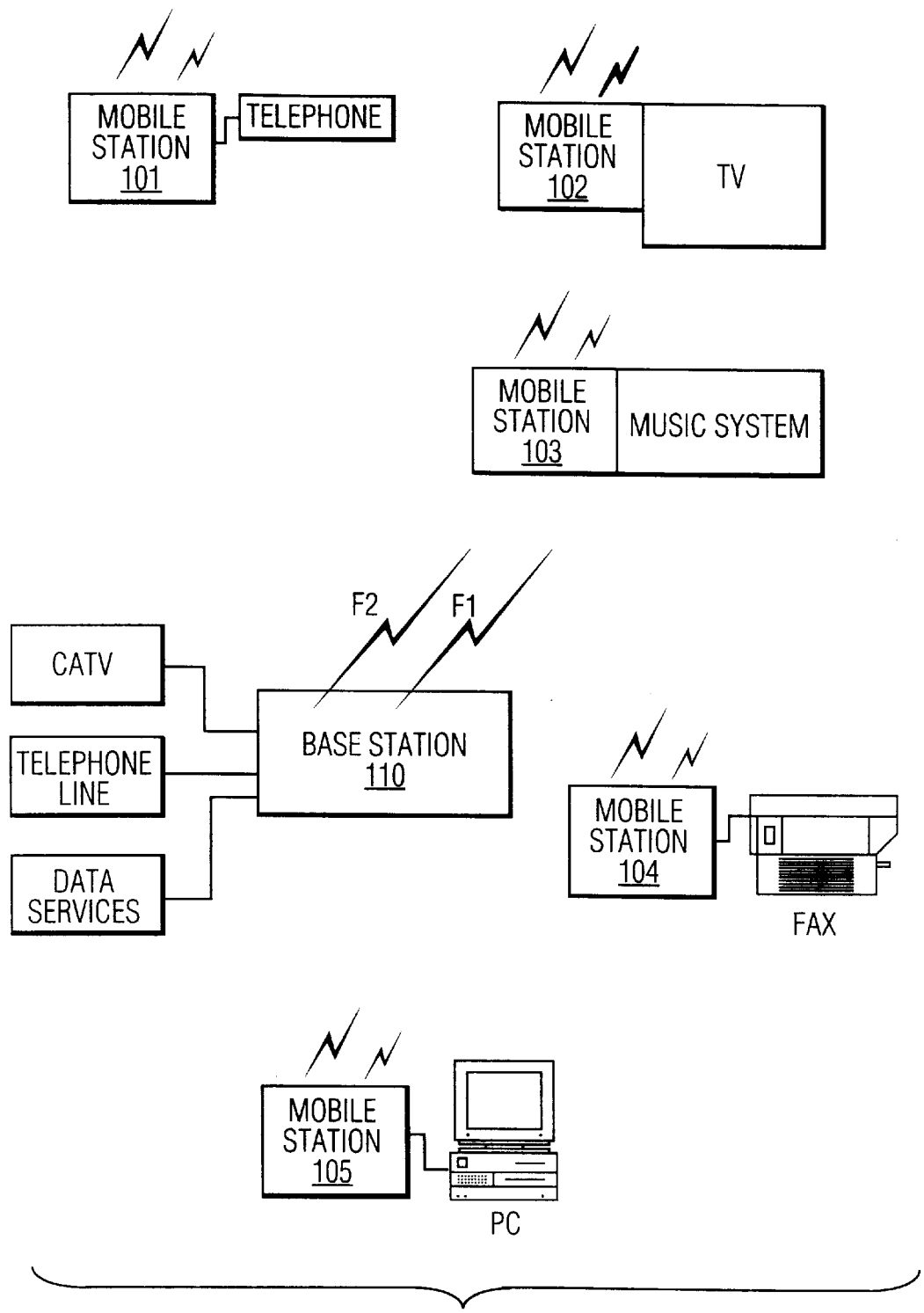
FIG. 1 shows a network of wireless devices.

FIG. 1 shows a wireless network, comprised of mobile stations 101 through 105, and a base station 110. For ease of understanding, one frequency for sending information to the base station, F1, and one frequency for receiving information from the base station, F2, is shown, although alternative embodiments will be further disclose the use of the same frequency for both transmission and reception. The mobile station equipment can either be discrete, or incorporated directly into the destination device, such as a telephone. Each mobile station on this network is assigned an address. For simplicity, address 1 is assigned to mobile station 101, address 2 to station 102, etc. The assignment of addresses can be established either by setting switches on each device, or by communicating messages which instruct the device to change its internal address. Also, additional devices can be added to the network, or existing devices deleted, through the use of these address assigning and changing messages. Techniques are commonly known for such address initialization and are not presented herein.

Because each mobile station will be transmitting on the same frequency to the base station, a protocol must be established to manage communications on this network.

Figure 2:
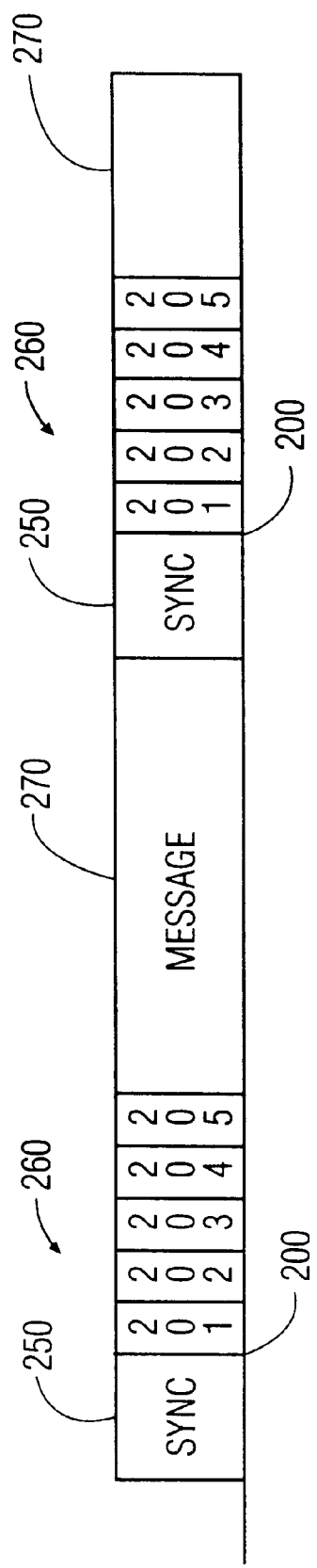
FIG. 2 shows a timing diagram for receiving or transmitting control bits in accordance with this invention.

FIG. 2 shows a protocol for transmitting to a base station in a wireless network in accordance with this invention. At the first period of time 250, the base station 110 will transmit a synchronizing pattern, which will be used by each station to establish a common time reference 200. The second period of time 260 is subdivided into sub time intervals 201 through 205. These time intervals are assigned to each mobile station 101 through 105, corresponding to their addresses 1 through 5. These time intervals are, for efficiency, of very short duration, and each has a fixed relationship to the time 200 established by the master station. If a mobile station has a message to transmit to the base station, it will transmit a burst of energy at the network frequency during its assigned time slot. That is, if mobile station 103 has information to transmit, it will transmit a burst of energy during time interval 203, informing the base station that the mobile station with address 3 has information to send. During time period 270, data transfer can be accomplished, using the protocol established for such data transfer, independent of this energy burst signalling protocol.

This particular embodiment is particularly well suited to a network with a relative ranking of mobile stations, wherein messages from address 1 have priority over messages from address 2, address 2 messages have priority over address 3 messages, etc. In such a network, the protocol could require that a mobile station not transmit an energy burst if an energy burst is detected preceding its assigned time slot. That is, if address 2 sends an energy burst, addresses 3 through 5 would not be allowed to send an energy burst. In so doing, the possibility of collision is eliminated, and the station which sent the energy burst would be free to send its data in the immediately following time period 270. The receiving base station would know that the data came from the address corresponding to the time interval of the detected energy burst.

This same protocol could be employed by the base station for transmitting information to the mobile stations. The base station 110 will transmit a synchronization pattern to the mobile stations, on the frequency assigned for receiving information from the base station, during time period 250. During time period 260, the base station will transmit an energy burst during the time interval assigned to the station intended to receive the message. The mobile station which corresponds to the time interval in which the energy burst occurred would thus be alerted to receive the subsequent data, transmitted by the base station during time period 270.

Note also that this protocol is particularly well suited for messages intended for more than one mobile station. An energy burst for each of the intended stations can be transmitted during period 260, so that each are alerted to receive the subsequent data transmitted during period 270.

This protocol is similar in concept to protocols which include the source and/or destination addresses within the message data, but offers significant advantages through the use of energy bursts, as herein described. An energy burst, as the name implies, is a short burst of energy transmitted at the assigned radio frequency. Contrary to a data signal, this energy burst has a very easy to satisfy criteria. Existing digital devices are very well suited for precise time measurements, particularly with reference to a periodically asserted synchronization pattern. Thus, specifying time as the relevant criteria, rather than content, allows for a very cost effective solution. Rather than specifying content-related criteria, as must be done for data signals, the critical specification is merely when the signal occurs, and not its content.

Figure 3A:
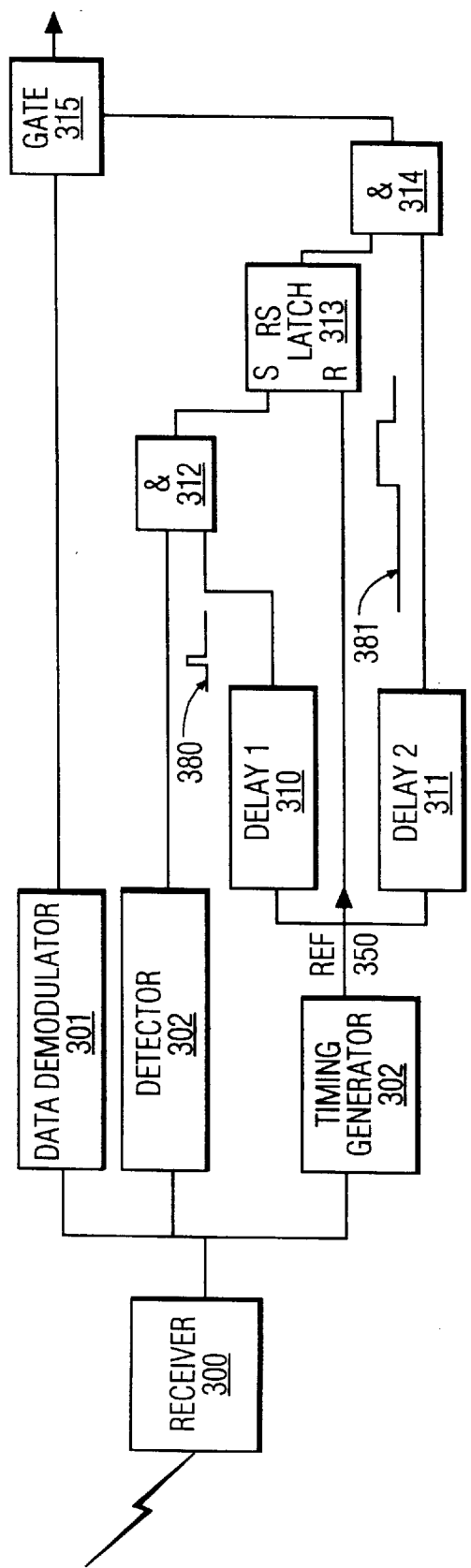
FIG. 3 shows a circuit diagram for receiving and transmitting control bits in accordance with this invention.

FIG. 3 shows a device for the reception or transmission of control information through the use of energy bursts at specified times, in accordance with this invention. In FIG. 3a, the energy pulse detector 302 is shown separate from the data demodulator 301, exemplifying the fact that energy burst detection does not require the signal processing typically applied for data reception. The receiver 300 receives a signal from, for example, a base station 110. A timing generator 303 provides a means for detecting the sync signal 250 and establishing the time reference 200 of FIG. 2. The timing generator 303 produces a pulse at time 200 on Ref 350. This ref signal resets the RS latch 313, and is also input to delay elements 310 and 311. The delay element 310 produces a pulse 380 after a predetermined time from receipt of the pulse on Ref 350. The predetermined time is determined by the address assigned to each device, so as to correspond, in time, with one of the time intervals 201 through 205 shown in FIG. 2. This pulse 380 is input to the And gate 312. Also input to the And gate 312 is the output of the detector 302. If an energy pulse is detected during the period assigned to this device, as signalled by pulse 380, the output of the And gate 312 sets the RS Latch 313. Through the establishment of specific time intervals for each addressed device, the output of the RS Latch 313, therefore corresponds to the detection of a control signal from the base station intended for this device.

In this example embodiment, the detection of this control signal informs the device that the subsequent message from the base station 100 is intended for this device. The delay element 311 generates a signal 381 after a predetermined time from receipt of the pulse on Ref 350. This signal 381 is asserted for the duration of message time period 270. The And gate 314 thus enables the gate 315 during the message time period 270 if and only if the RS Latch had been set, as described above, by the receipt of an energy burst during the assigned time period.

Figure 3B:
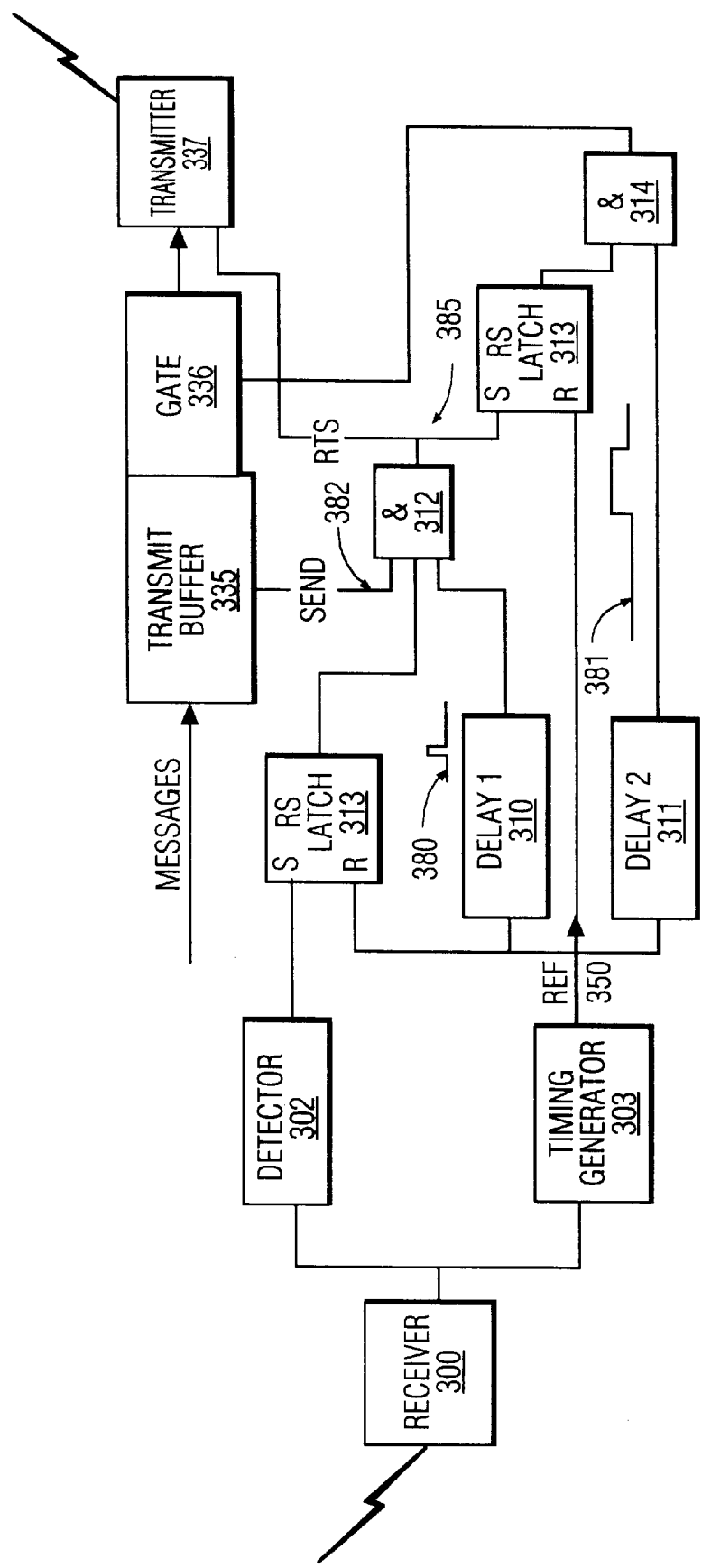

FIG. 3b shows a control device for generating an energy burst from a remote transmitter in accordance with this invention. Items having the same function as described in FIG. 3a have the same reference numerals. As presented above, the reference signal 350 will contain a pulse at a time reference 200 established by the base station's transmission of a sync signal 250. The RS Latch 313 will be reset by the occurrence of the pulse on reference signal 350. The delay element 310 will produce a pulse during the device's assigned time interval, one of 201 through 205. FIG. 3b contains an additional latch 330. This latch 330 is used to signal the occurrence of an energy burst prior to the time allocated for this device. The latch 330 is set by the reference signal 350. If an energy pulse is detected by detector 302, the latch 330 is reset. Thus, at the time of the pulse 380, the output of the latch 330 will be asserted if and only if no energy bursts have been detected since the latch was set by the reference pulse. The time interval pulse 380, the output of latch 330, and a control signal 382 are input to And gate 312. The And gate 312 will set the latch 313 during the time period 380 only if the latch 330 is set, signalling that no other transmitter sent an energy burst before time 380, and control signal 382 is asserted. The output of And gate 312 is also provided to the transmitter 337 as signal 385. Upon receipt of an asserted signal 385, the transmitter 337 will be enabled, thereby sending an energy burst. The detector 302 will subsequently detect this burst, which will cause latch 330 to reset, which will cause the And gate to deassert signal 385, thereby terminating the transmission of the energy burst. Alternatively, if the receiver 300 is disabled during transmission, the signal 385 will be deasserted at the end of timing interval pulse 380.

In this example embodiment, the control signal 382 is asserted whenever the device has a message to transmit, and the transmission of this message is effected after sending the above described energy burst. Messages are queued in transmit buffer 335. Upon receipt of a message, buffer 335 asserts the control signal 382. This control signal 382 causes the generation of an energy burst during the time period assigned to this device, as described above. The enabling of the transmission of the energy burst also sets latch 313, the output of which is input to And gate 314. The delay element 311 asserts a signal 381 during the message period 270. If latch 313 is set during this period, the And gate 314 asserts an enabling signal to the gate 336, which effects the transmission of the contents of the transmit buffer 335. If there are no additional messages queued, the transmit buffer 335 deasserts the control signal 382, thereby inhibiting the subsequent transmission of an energy burst.

The example embodiments in FIG. 3 demonstrate the use of energy bursts for receiving and transmitting control signals which subsequently control the reception and transmission of messages. The same, or similar, logic could be employed to receive or transmit energy bursts at the appropriate time intervals corresponding to other control signals as well. Also, the common elements of FIGS. 3a and 3b can be combined, and the embodiment shown could be implemented and executed by a software program, or a combination of hardware and software, as would be evident to one skilled in the art.

Note that the energy burst transmission and reception can be accomplished without the data equalization techniques normally employed for reliable, error free, data transmission. The automatic gain control, signal pre- and post-conditioning, error correction, and other techniques required to reliably determine which of two or more values have been received during data transmission, are not required to determine whether or not a burst of energy occurred at a particular time.

The embodiment presented thus far required a separate transmit and receive frequency relative to the base station, as well as the generation of a synchronizing pattern by the base station, and synchronization at the mobile stations, at each of these frequencies. FIG. 4 shows a protocol which eliminates this redundant process. As shown, at time period 450, the base station transmits a synchronizing pattern, on the one frequency used for both transmission and reception. This synchronizing pattern establishes a time reference 400. Time period 460 contains time intervals 461 through 465, corresponding to mobile station addresses 1 through 5. During time period 460, the base station transmits one or more energy bursts during the time interval corresponding to the intended receiving mobile station(s). The receipt of an energy burst during the assigned time interval alerts the corresponding mobile station to receive the subsequent data, transmitted by the base station during time period 470. Time period 480 is also partitioned into time periods 481 through 485, corresponding to mobile station addresses 1 through 5. If a mobile station has data to transmit, it transmits an energy burst during its assigned time interval, relative to time reference 400. As previously described, the protocol for transmitting to the base station would dictate that a mobile station not transmit an energy burst if it detects an energy burst in time intervals prior to its assigned interval. The mobile station which transmits the energy burst would then subsequently transmits its data during time period 490.

The prior embodiments demonstrate the use of energy burst transmissions for predominantly single addressee communications. That is, within the time frames previously described, one remote station transmits data to the base station, and, except in the case of multiple addressees for the same message, the base station transmits data to one remote station. In such protocols, there is one energy burst period per message, and, in a network with heavy traffic, such a protocol may be inefficient.

Figure 5:
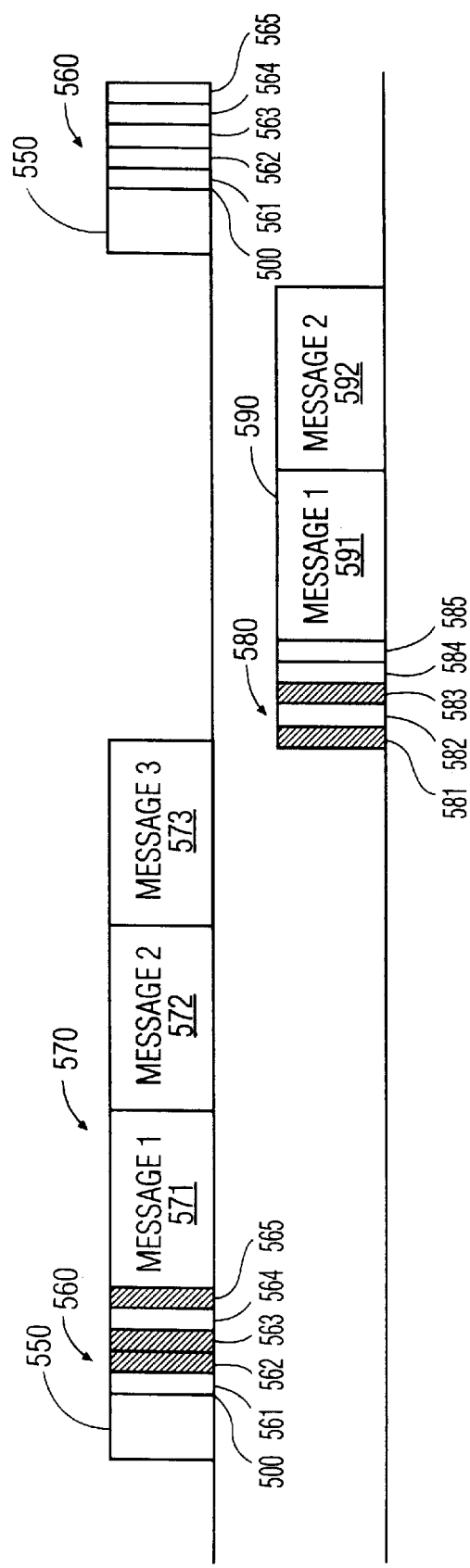
FIG. 5 shows a timing diagram for communicating multiple messages on the same frequency, or wire, in accordance with this invention.

FIG. 5 shows an embodiment of the subject invention, particularly well suited for networks with continually heavy traffic patterns. In this embodiment, the periods 570 and 590 following the energy burst periods 560 and 580 contain a variable number of message transfer periods. For example, if the base station has messages for three remote stations, three message transfer periods would follow the base stations energy burst period. The base station would assert an energy burst at the time periods assigned to each of the remote stations, and transmit the messages in the same order as the asserted energy bursts. FIG. 5 shows, for example, that remote stations 2, 3, and 5 have messages being sent from the base station, as signalled by energy bursts at time periods 502, 503, and 505 Remote station 2's message will be transmitted first, at message transfer period 571; next, remote station 3's message, at message transfer period 572, followed by remote station 5's message, at period 573. Each remote station will note whether its assigned time period contains an energy burst, and also how many energy bursts, for other remote stations, have preceded its burst. In the example given, station 2 will note that it received the first burst, and will therefore know that its message will be the first message from the base station. Similarly, station 3 would note that it received the second burst, and hence its message is the second message. Station 5 would similarly determine that its message is the third message. All stations in this embodiment will note how many messages are being transmitted, by noting how many energy burst are transmitted in period 560. Thus, the stations will know when the time period 580 begins, relative to the time reference 500. In this embodiment, the remote stations are not prohibited from asserting an energy burst when another remote station has also asserted an energy burst. If two remote stations have messages to send to the base station, two message transfer periods will follow the remote station energy burst period. Each remote station which has a message to send asserts an energy burst during its assigned time slot in period 580. Each remote station also notes how many other remote stations have transmitted an energy burst before them. If a particular remote station is the first station to transmit an energy burst, it sends its message in the first message slot 291 of period 290. If another remote station notes that one energy burst has preceded its energy burst, it sends its message in the second message slot 292. Shown in FIG. 5, stations 1 and 3 have asserted energy bursts in time slots 581 and 583. Station 1 transmits its message in the first message time slot 591. Station 3, having noted that one energy burst 581 has preceded its energy burst 583, transmits its message in the second message time slot 592. The base station, knowing that only two remote stations had messages to send, can immediately recommence the process by transmitting the synchronizing sequence for the next set of messages. Note that if there are no messages from the remote stations, the energy burst time period 580 will not contain any energy bursts and the synchronizing sequence 550 can commence immediately after the energy burst period 580. Similarly, if the base station has no messages to send, energy burst period 580 can begin immediately after energy burst period 560.

It is apparent in these embodiments that the format of the message transfer protocol is independent of the energy burst timing protocol. This invention is not limited to the transfer protocols presented herein. For added reliability, for example, explicit addressing could be included within each message. The use of energy bursts in this protocol would serve the purpose of collision avoidance, by allocating the message transfer time in accordance with the occurrence of energy bursts, but would not be exclusively relied upon to determine the addressees. In a similar manner, the energy burst timing protocol could be employed in a network without an explicit base station. Each station could listen to all transmitted messages, and select those messages which contained its assigned address, either as an explicit address, or as determined by the energy burst time interval. The energy burst timing protocol would be established by having one station transmit the timing signal, as in a distributed synchronization network, wherein the synchronizing signal is transmitted by any station which initiates the communication.

It is apparent that the use of the energy burst timing protocol disclosed is not limited to its use as a "request to send" signal as presented above. The energy burst timing protocol could be employed to signal other events as well. For example, an intervening period could be inserted between the aforementioned "request to send" energy burst period and the message transfer period. In this intervening period, the intended recipients could utilize energy bursts to signal a corresponding "clear to send" signal.

It is also apparent that the use of an energy burst timing protocol as disclosed herein is not limited to networks, nor to wireless networks in particular. In a point to point communications systems, wherein the possibility of collision does not exist, energy bursts may be used exclusively for acknowledgements. In a wired network, energy burst periods could be employed to eliminate signalling wires, by adding one or more burst periods to the message transferring wire.

Although the primary application of the energy burst timing protocol in accordance with this invention is for single bit information, such as yes/no signals, multi-bit information can be accommodated as well. The protocol may call for a priority signal, wherein the transmitter assigns a priority, for example from 1 to 3, for each message. Two time periods per remote station could be allocated in the energy burst period, and two bits could be transmitted as follows: 00 for no message, 01 for a Priority 1 message, 10 for a Priority 2 message, 11 for a Priority 3 message.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method for communicating a set of control signals among communication devices operating in a network, wherein each of said control signals within said set is associated with each of said communication devices, said control signals each only having a first and second state, said method comprising:

allocating, relative to a time reference, intervals of time associated with each of said communication devices;

transmitting, via a first of said communication devices, a synchronizing signal to all other communication devices on said network;

receiving, by each of said other communication devices on said network, said synchronizing signal from said first communication device;

determining in dependence upon said transmission and reception of said synchronizing signal, said time reference; and, transmitting, by any of said communication devices, a burst of energy during the time period associated with each of said devices, if said control signal associated with said each device is a particular one of said first and second state.

2. A method as claimed in claim 1, wherein said communication devices communicate via radio frequency waves, and said burst of energy is a signal transmitted at a specified radio frequency.

3. A method for communicating a set of control signals among communication devices operating in a network, wherein each of said control signals within said set is associated with each of said communication devices, said control signals each having a first and second state, said method comprising:

allocating, relative to a time reference, intervals of time associated with each of said communication devices;

transmitting, via a first of said communication devices, a synchronizing signal to all other communication devices on said network;

receiving, by each of said other communication devices on said network, said synchronizing signal from said first communication device;

determining in dependence upon said transmission and reception of said synchronizing signal, said time reference;

transmitting, by any of said communication devices, a burst of energy during the time period associated with each of said devices in dependence upon if said control signal associated with said each device is in one of said first and second state; and transmitting a message from the communications device associated with the time interval within which said energy burst was transmitted.

4. A method for communicating a set of control signals among communication devices operating in a network, wherein each of said control signals within said set is associated with each of said communication devices, said control signals each having a first and second state, said method comprising:

allocating, relative to a time reference, intervals of time associated with each of said communication devices;

transmitting, via a first of said communication devices, a synchronizing signal to all other communication devices on said network;

receiving, by each of said other communication devices on said network, said synchronizing signal from said first communication device;

determining in dependence upon said transmission and reception of said synchronizing signal, said time reference;

transmitting, by any of said communication devices, a burst of energy during the time period associated with each of said devices in dependence upon if said control signal associated with said each device is in one of said first and second state; and transmitting a message to the communications device associated with the time interval within which said energy burst was transmitted.

5. A base station for communicating a set of control signals to communication devices operating in a network, wherein each of said control signals within said set is associated with each of said communication devices, said control signals each only having one of a first and second state, said base station comprising:

means for transmitting a synchronizing signal to all of said communication devices on said network, said synchronizing signal establishing a time reference common to all communication devices on said network, means for delineating, relative to said time reference, intervals of time associated with each of said communication devices, means for transmitting a burst of energy during the time interval associated with each of said communication devices in dependence upon whether said control signal associated with said each communication device is in a particular one of said first and second state.

6. A base station as in claim 5, wherein said means for transmitting a burst of energy comprises a radio frequency transmitter.

7. A base station for communicating a set of control signals to communication devices operating in a network, wherein each of said control signals within said set is associated with each of said communication devices, said control signals each having a first and second state, said base station comprising:

means for transmitting a synchronizing signal to all of said communication devices on said network, said synchronizing signal establishing a time reference common to all communication devices on said network, means for delineating, relative to said time reference, intervals of time associated with each of said communication devices, means for transmitting a burst of energy during the time interval associated with each of said communication devices in dependence upon if said control signal associated with said each communication device is in one of said first and second state, and means for transmitting messages to each communication device in dependence on said transmission of said energy burst.

8. A base station for communicating a set of control signals to communication devices operating in a network, wherein each of said control signals within said set is associated with each of said communication devices, said control signals each having a first and second state, said base station comprising:

means for transmitting a synchronizing signal to all of said communication devices on said network, said synchronizing signal establishing a time reference common to all communication devices on said network, means for delineating, relative to said time reference, intervals of time associated with each of said communication devices, means for transmitting a burst of energy during the time interval associated with each of said communication devices in dependence upon if said control signal associated with said each communication device is in one of said first and second state, and means for detecting a second burst of energy from each of said communication devices.

9. A base station as in claim 8, further comprising means for receiving a message from each communication device in dependence upon the detection of said second burst of energy.

10. A remote station for receiving a control signal from a base station operating in a network, wherein said control signal is associated with said remote station and said control signal only having one of a first and second state, said remote station comprising:

means for receiving a synchronizing signal from said base station, means for delineating, relative to a synchronizing signal, an interval of time allocated to said remote station for reception of said control signal, means for detecting a burst of energy during said allocated time interval, means for determining if said control signal is in a particular one of said first and second state if said burst of energy was detected.

11. A remote station as in claim 10, wherein said burst of energy comprises a radio frequency signal of short duration.

12. A remote station for receiving a control signal from a base station operating in a network, wherein said control signal is associated with said remote station, said control signal having one of a first and second state, said remote station comprising:

means for receiving a synchronizing signal from said base station, means for delineating, relative to a synchronizing signal, an interval of time allocated to said remote station for reception of said control signal, means for detecting a burst of energy during said allocated time interval, means for determining if said control signal is in one of said first and second state if said burst of energy was detected, and means to receive messages from said base station, in dependence upon the detection of said burst of energy.

13. A remote station as in claim 12, further comprising means for transmitting a second burst of energy.

14. A remote station as in claim 13, further comprising means for transmitting a message in dependence upon the transmission of said second burst of energy.

15. A communications device for communicating with one or more communication stations comprising:

means to delineate a set of time intervals following a known time reference, each of said time intervals within said set being associated with each of said communication stations, means for receiving a synchronizing signal from a first communication device, means for determining, by said reception of said synchronizing signal, said time reference, and, means for transmitting a burst of energy during the time interval associated with a target communication station.

16. A communications device as in claim 15, wherein said means for receiving and transmitting are operative at a radio frequency, and said burst of energy comprises a signal transmitted at that frequency.

17. A communications device for communicating messages with one or more communication stations comprising:

means to delineate a first set of time intervals following a known time reference, each of said time intervals within said first set being associated with each of said communication stations, means to delineate a second set of time intervals following said known time reference, each of said time intervals within said second set being associated with each of said communication stations, means to transmit a first burst of energy during the time interval of the first set associated with a target communication station in dependence upon whether a first message is to be sent to said target communication station, means to transmit said first message to said target communication station, means to detect a second burst of energy from a source communication station during the time interval of the second set which is associated with said source communication station, means to receive said second message from said source communication station in dependence upon whether said second burst of energy was detected.

* * * * *

UNITED STATES PATENT AND TRADEMARK OFFICE
CERTIFICATE OF CORRECTION

PATENT NO.   : 6,069,901
DATED         : May 30, 2000
INVENTOR(S)  : Samir Hulyalkar and Chiu Ngo It is certified that error appears in the above-identified patent and that said Letters Patent is hereby corrected as shown below:

<u>Title page,</u>
Item [75] Inventors, Samir Hulyalkar, change "White Plains" to -- Ossining --.

Signed and Sealed this

Fourteenth Day of May, 2002

Attest:

Attesting Officer

JAMES E. ROGAN
*Director of the United States Patent and Trademark Office*